(12) United States Patent
White

(10) Patent No.: US 10,814,805 B2
(45) Date of Patent: Oct. 27, 2020

(54) SENSOR WIRING WITH PARALLEL BUS PORT CONFIGURATION

(71) Applicant: Robert Bosch GmbH, Stuttgart (DE)

(72) Inventor: Michael White, Livonia, MI (US)

( * ) Notice: Subject to any disclaimer, the term of this patent is extended or adjusted under 35 U.S.C. 154(b) by 0 days.

(21) Appl. No.: 16/177,903

(22) Filed: Nov. 1, 2018

(65) Prior Publication Data

US 2020/0139904 A1 May 7, 2020

(51) Int. Cl.
*B60R 16/023* (2006.01)
*H04L 29/08* (2006.01)
*H04L 12/40* (2006.01)

(52) U.S. Cl.
CPC ............ *B60R 16/023* (2013.01); *H04L 12/40* (2013.01); *H04L 67/12* (2013.01); *H04L 2012/40273* (2013.01)

(58) Field of Classification Search
CPC ..... H04W 4/38; H04B 5/0031; B60R 16/023; H04L 67/12; H04L 12/40
See application file for complete search history.

(56) References Cited

U.S. PATENT DOCUMENTS

| | | | |
|---|---|---|---|
| 7,278,314 B2 | 10/2007 | Sato et al. | |
| 8,446,943 B2 | 5/2013 | Leach et al. | |
| 9,802,622 B2 | 10/2017 | Park | |
| 10,103,780 B1 | 10/2018 | Laifenfeld et al. | |
| 2005/0192727 A1 | 9/2005 | Shostak et al. | |
| 2005/0238119 A1* | 10/2005 | Zhu | H03K 5/082 375/316 |
| 2008/0055062 A1* | 3/2008 | Christenson | B60C 23/0416 340/447 |
| 2016/0140784 A1* | 5/2016 | Akanuma | G07C 5/008 701/29.7 |
| 2016/0154095 A1* | 6/2016 | Lee | G01S 15/931 73/629 |
| 2017/0334439 A1 | 11/2017 | Lee et al. | |
| 2018/0001928 A1* | 1/2018 | Lavoie | B62D 13/06 |
| 2018/0013578 A1* | 1/2018 | Gozloo | G06F 3/0619 |
| 2018/0041874 A1* | 2/2018 | Kelly | H04W 4/38 |
| 2018/0082590 A1* | 3/2018 | MacNeille | G08G 1/0133 |
| 2018/0204464 A1 | 7/2018 | Lavoie et al. | |
| 2019/0229758 A1* | 7/2019 | Finkelstein | H04L 27/2626 |
| 2019/0324740 A1* | 10/2019 | Fox | G06F 8/654 |

FOREIGN PATENT DOCUMENTS

JP 2004350137 A 12/2004

* cited by examiner

*Primary Examiner* — Omer S Mian

(57) ABSTRACT

A vehicular sensor system comprising an electronic control unit and a number of sensors associated with busses of the electronic control unit. The sensors may be wired in parallel with respect to their respective associated bus. The system may comprise a multi-pin power bus providing multiplex communication between the electronic control unit and the sensors. An associated method may be utilized to initialize and operate the sensor system.

17 Claims, 4 Drawing Sheets

SENSOR WIRING WITH PARALLEL BUS PORT CONFIGURATION

TECHNICAL FIELD

This disclosure relates to data communication between a vehicular electronic control unit and a number of sensors. In some embodiments, the sensors comprise motion or proximity sensors. In some embodiments, the sensors comprise ultrasonic sensors. In some embodiments, the data communication between the electronic control unit and the number of sensors utilizes a time-division multiplexing protocol.

BACKGROUND

Modern automotive vehicles may have sensors or sensor arrays operable to provide data useful in providing feedback to the driver or performing advanced driver assistance operations. In some vehicles, sensors may be operable to provide data useful in providing functions of self-driving having autonomous or partially-autonomous operation of the vehicle. Such sensors often include proximity or motion sensors, which are used to generate data indicating the presence of stationary or moving objects which must be considered to avoid a collision during vehicle movement.

Sensors may be embodied within a vehicle as individual sensors or as part of a sensor array. Sensors interact with vehicle processors using specialized sub-processors, called electronic control units (ECU). An ECU may be in data communication with a number of sensors. It is desirable to maximize the efficiency of communication between sensors and their respective ECU and to minimize costs in implementing communication channels.

SUMMARY

One aspect of this disclosure is directed to a vehicular sensor system comprising an electronic control unit in data communication with a number of sensors via a multi-pin bus. The number of sensors may be coupled in a parallel configuration to achieve the data communication. Each of the number of sensors may comprise a sensor processor and a sensor memory. Data communication between the electronic control unit and the number of sensors may utilize a time-division multiplex signal. The time-division multiplex signal may comprise a data signal and a power signal. In some embodiments, the electronic control unit may be in data communication with sensors associated with a plurality of busses.

Another aspect of this disclosure is directed to a method of data communication between a vehicular electronic control unit and a number of sensors. The method may comprise establishing a multi-pin bus connection between an electronic control unit and a number of sensors. The method may further comprise transmitting an activation signal from the electronic control unit to the number of sensors, and the sensors transmitting signifiers to the electronic control unit in response. The method may further comprise maintaining data communication using a time-division multiplexing protocol defined in response to the received signifiers. The method may utilize a multiplex signal comprising a power signal component and a data signal component.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1B:
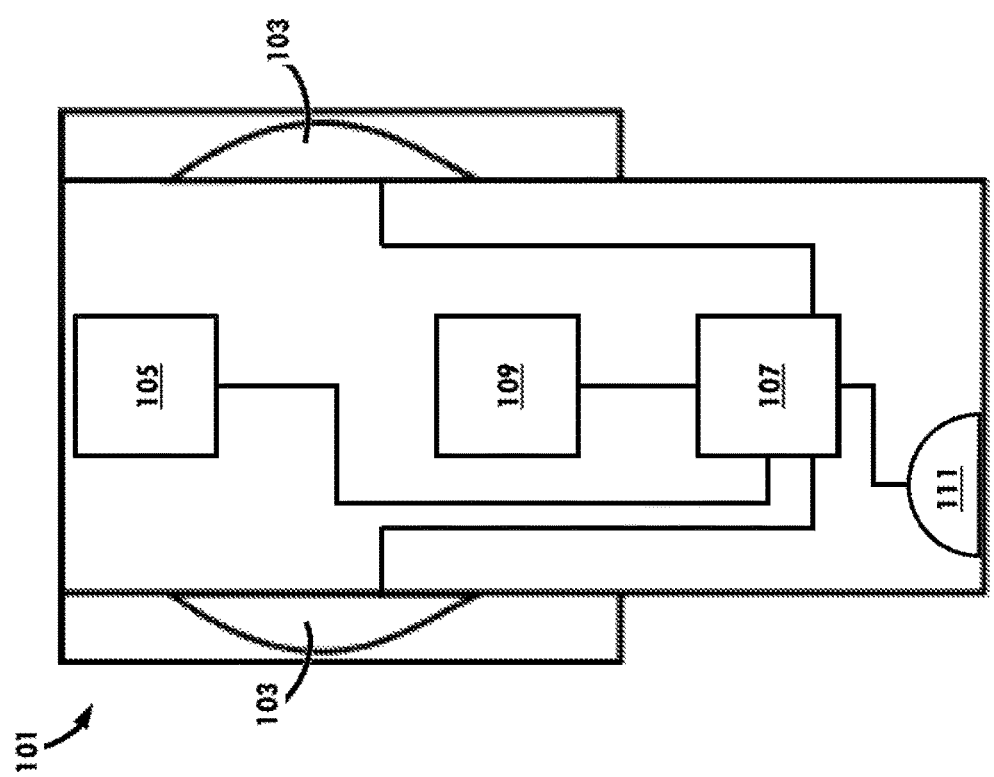
FIG. 1B is a diagrammatic illustration of an embodiment of an ultrasonic sensor.
Figure 1A:
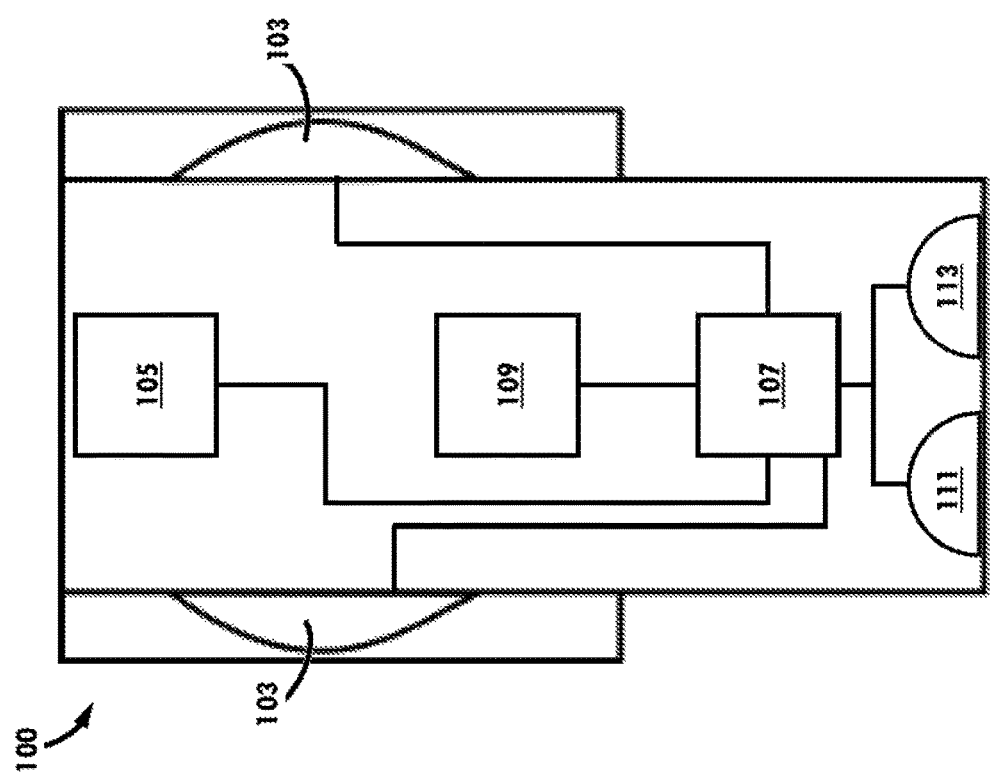
FIG. 1A is a diagrammatic illustration of an embodiment of an ultrasonic sensor.

FIG. 1A and FIG. 1B show diagrammatic illustrations of types of sensors useful for detecting proximity and motion of objects. The sensors depicted may be used within a vehicular sensor system. FIG. 1A depicts a first embodiment of a sensor 100, and FIG. 1B depicts a second embodiment of a sensor 101. Sensor 100 and sensor 101 comprise many similar components. In the depicted embodiment, each of sensor 100 and sensor 101 may comprise ultrasonic sensors, but other embodiments may comprise other motion sensors without deviating from the teachings disclosed herein.

Sensor 100 may comprise a number of ultrasonic transmitters 103 operable to generate ultrasonic transmissions used to detect objects in the environment of the vehicle using echolocation. Ultrasonic transmissions are transmitted to reflect from objects in the environment and be captured by an ultrasonic receiver 105. Data indicating the status of ultrasonic reflections may then be shared with a sensor processor 107. In some embodiments, ultrasonic transmitters 103 and ultrasonic receiver 105 may be combined into a single ultrasonic transceiver operable to both send and receive ultrasonic signals without deviating from the teachings disclosed herein.

Sensor processor 107 may be operable to enable data communication between components of the sensor, and also operable to enable data communication between sensor 100 and external devices. Sensor processor 107 may be in data communication with a sensor memory 109. Sensor memory 109 may be operable to provide executable instructions to sensor processor 107, and may comprise non-volatile portions operable to provide signifier data associated with sensor 100. Signifier data may comprise a part number identifying the type of sensor to an external device, or a serial number identifying the sensor uniquely. Sensor memory 109 may comprise other data that may be useful for operation of sensor processor 107, or utilization of the sensor 100 within the context of a sensor system. For example, sensor memory 109 may comprise a number of codes used to indicate behaviors observed by the sensor during operation.

Sensor 100 may further comprise a number of connectors operable to provide electrical signal communication between sensor 100 and external devices. A power connector 111 may be operably coupled to a power bus. Power connector 111 may be electrically coupled to one or more elements of sensor 100 and operable to provide electrical power to each of the components. In the depicted embodiment, power connector 111 may be electrically coupled to sensor processor 107, which provides power to the other components, but other embodiments may comprise other configurations without deviating from the teachings disclosed herein. Power connector 111 may be configured for a single pin connection or a multi-pin connection. In the depicted embodiment, power connector 111 may comprise a two-pin connection, but other embodiments may comprise other configurations without deviating from the teachings disclosed herein.

Sensor 100 may additionally comprise a data connector 113. Data connector 113 may be operable to transmit and receive data signals from external devices. In the depicted embodiment, data connector 113 may comprise a multi-pin connector operable to interface with a multi-pin bus, but other embodiments may comprise other configurations without deviating from the teachings disclosed herein.

FIG. 1B depicts an embodiment of an ultrasonic sensor 101. Sensor 101 comprises a very similar configuration to that of sensor 100, chiefly distinguishable because sensor 101 does not comprise a data connector 113. Sensor 101 may instead be operable to utilize modulation of the current supplying power through power connector 111 to interpret data signals. In the depicted embodiment, sensor processor 107 may be operable to monitor the power signal received at power connector 111, and may be further operable to control the modulation of current at power connector 111 in order to transmit data signals to external devices. In such embodiments, sensor processor 107 may be operable to switch between a receiving mode and a transmitting mode in response to received data commands observed at power connector 111. Further distinctions between the operations of sensor 100 and sensor 101 will be explained below with respect to the use of each sensor in the context of a sensor system.

Figure 2:
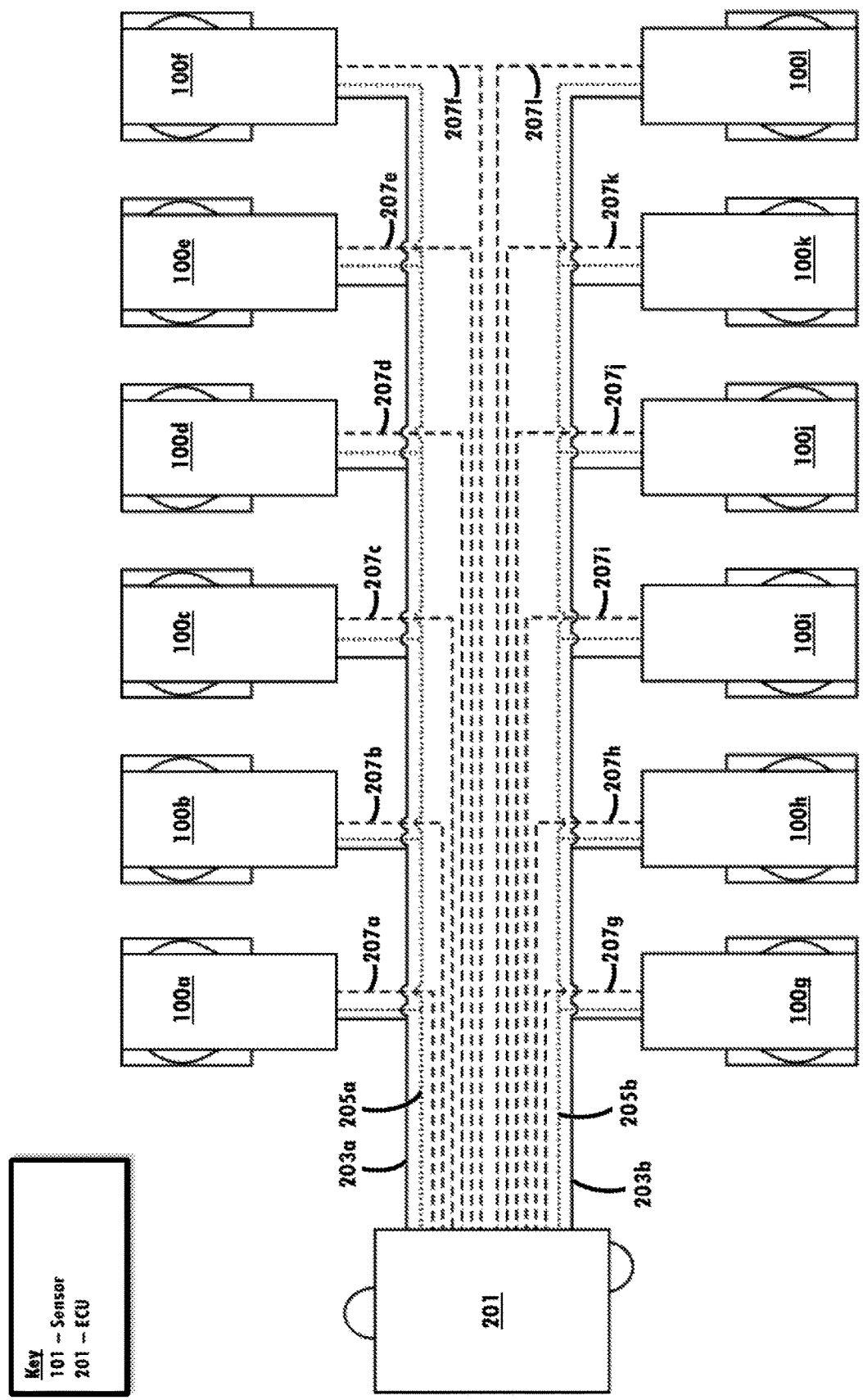
FIG. 2 is a diagrammatic illustration of a first vehicular sensor system.

FIG. 2 is a diagrammatic illustration of a vehicular sensor system comprising a number of sensors 100 and an electronic control unit (ECU) 201 operable to coordinate operation of the sensors. In the depicted embodiment, ECU 201 may be operable to provide power supply connections to each of sensors 100. In the depicted embodiment, power supply connections comprise a positive power line 203 and a neutral ground line 205, but other embodiments may comprise a different number of power supply connections without deviating from the teachings disclosed herein. In some embodiments, ECU 201 may be configured to provide power using a single power supply line without deviating from the teachings disclosed herein. In the depicted embodiment, ECU 201 may be configured to provide two power busses, each comprising a set of power line connections. In the depicted embodiment, a first power bus may comprise a positive power line 203a and a neutral ground line 205a, and a second power bus may comprise a positive power line 203b and a neutral ground line 205b. Each power bus may be operable to provide electrical power to a number of sensors wired in parallel connection to each other. In the depicted embodiment, each power bus may be operable to support six sensors, but other embodiments may comprise a different number of sensors without deviating from the teachings disclosed herein.

Other embodiments may comprise a different number of power busses without deviating from the teachings disclosed herein. In the depicted embodiment, each of sensors 100a-1 may be electrically coupled to ECU 201 using one of data busses 207a-1 respectively. In this embodiment, ECU 201 may be configured to utilize distinct data busses for each of sensors 100, and must further be configured to comprise sufficient connectors to support each of data busses 207 in order to accommodate each additional sensor. In the depicted embodiment, ECU 201 is configured to accommodate twelve sensors 100, but other embodiments may comprise an arbitrary number of sensors without deviating from the teachings disclosed herein. Configurations accommodating larger numbers of sensors 100 may increase the costs of ECU 201 to accommodate a greater number of sensors 100. Configurations accommodating larger numbers of sensors 100 may additionally increase the processing complexity of ECU 201, which may increase costs of processing components of ECU 201.

Figure 3:
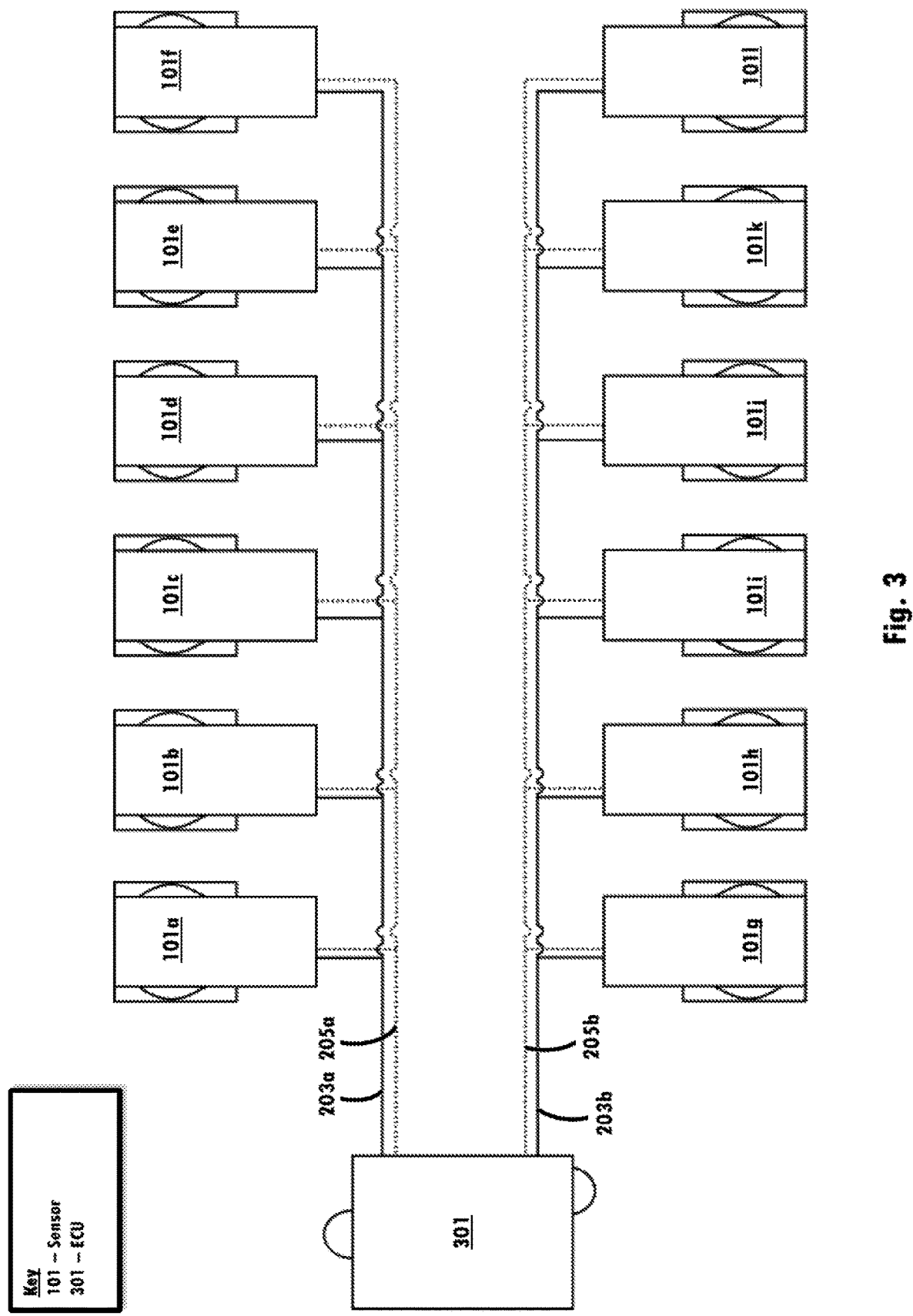
FIG. 3 is a diagrammatic illustration of second vehicular sensor system.

FIG. 3 provides a diagrammatic illustration of a vehicular sensor system comprising a number of sensors 101 electrically coupled in parallel to an electronic control unit (ECU) 301. In the depicted embodiment, ECU 301 may be operable to provide power supply connections to each of sensors 100. In the depicted embodiment, power supply connections comprise a positive power line 203 and a neutral ground line 205, but other embodiments may comprise a different number of power supply connections without deviating from the teachings disclosed herein. In some embodiments, ECU 201 may be configured to provide power using a single power supply line without deviating from the teachings disclosed herein. In the depicted embodiment, ECU 301 may be configured to provide two power busses, each comprising a set of power line connections. In the depicted embodiment, a first power bus may comprise a positive power line 203a and a neutral ground line 205a, and a second power bus may comprise a positive power line 203b and a neutral ground line 205b. Each power bus may be operable to provide electrical power to a number of sensors wired in parallel connection to each other. In the depicted embodiment, each power bus may be operable to support six sensors, but other embodiments may comprise a different number of sensors without deviating from the teachings disclosed herein.

ECU 301 is distinguished from ECU 201 (see FIG. 2) because ECU 301 may be configured to utilize the power busses to multiplex both power signals and data signals to each of sensors 101. Because ECU 301 is operable to provide power signals to each of sensors 101, data signals may be multiplexed along each power bus by modulating the current being sent between ECU 201 and each of sensors 101. Because each of sensors 101 associated with a particular power bus is wired in parallel, ECU 301 and each of the associated sensors 101 may utilize a time-division multiplexing (TDM) protocol in order to ensure that the signals are properly interpreted when observed on the power bus.

In the depicted embodiment, modulations of the current provided in the positive power lines 203 may provide a pulse-code transmission that may be interpreted by ECU 301 or one of sensor processors 107 (see FIG. 1B). In order to properly transmit and receive data signals along a power bus, a synchronization signal must be present within the data signal so that each of ECU 301 and the sensors 101 associated with a particular bus are aware of the current timeline and when time divisions have transpired. In the depicted embodiment, ECU 301 may assign time divisions to a protocol for a power bus that indicate when each sensor 101 should expect to receive commands and transmit commands of its own. In such a configuration, ECU 301 may request a signifier providing identification data for each of the sensors 101 associated with a particular power bus.

In the depicted embodiment, a first power bus is associated with six sensors 101a-f, and a second power bus is associated with six sensors 101g-1, but other embodiments may comprise a different number of power busses for ECU 301 without deviating from the teachings disclosed herein. Additional power busses may increase the costs of ECU 301 by requiring additional processing components to accommodate the operations of the power bus. However, in such embodiments, the costs of each individual sensor 101 may be unchanged. Though the depicted embodiment associates six sensors 101 with a power bus, other embodiments may comprise a different number of sensors 101 without deviating from the teachings disclosed herein. Advantageously, power busses associated with a smaller number of sensors 101 may require shorter time divisions to properly accommodate data transmission in both directions compared to larger groups of associated sensors 101.

In the depicted embodiment, a two-pin power bus configuration may be utilized in order to enable ECU 301 or one or more of sensors 101 to perform noise reduction calculations or echo suppression calculations. Other embodiments may comprise other configurations without deviating from the teachings disclosed herein.

ECU 301 and sensors 101 may require a jointly-understood TDM protocol for proper operation. In the depicted embodiment, one power bus is associated with six sensors 101, and thus the protocol may accommodate at least six time divisions for ECU transmission and six time divisions for sensor transmission: one time division for each sensor to transmit its data to ECU 301. In this embodiment, the twelve total time divisions may comprise a single time cycle for the power bus, but other embodiments may comprise other configurations without deviating from the teachings disclosed herein.

In other embodiments, the TDM protocol may be formatted such that the ECU transmission division associated with a particular sensor 101 is paired in the timeline with that particular sensor's transmission division. Other TDM protocols may comprise other configurations of transmission divisions. One of ordinary skill in the art will recognize that transmission divisions may occur in any order within a complete time cycle without deviating from the teachings disclosed herein, provided that a single time division comprises all necessary transmission divisions to accommodate sending and receiving data from ECU 301 to each of the sensors 101 associated with a particular power bus.

ECU 301 may require a signifier of each of the sensors 101 associated with particular power bus in order to establish a properly-formatted TDM protocol. Signifiers may comprise a part number indicating the position of each sensor 101 within the context of the associated vehicle of the sensor system. For example, a sensor mounted to the driver-side front fender of the vehicle may be associated with a different part number than a sensor mounted to the passenger-side rear fender of the vehicle. One of ordinary skill in the art will recognize that vehicle sensor system part numbers will depend upon the specification of the vehicle and the number of sensors associated with a particular ECU, and the bus configuration of the particular ECU.

In some embodiments, the signifier may comprise a serial number of an associated sensor 101. In such embodiments, ECU 301 may utilize the unique serial number identification of the associated sensor 101 to provide direct communication with each of the sensors associated with a particular power bus. In such embodiments, the TDM protocol may effectively provide arbitrary communication between ECU 301 and one or more of sensors 101 associated with a bus because a component of the protocol may specify a particular serial number for each transmission division. Such embodiments may advantageously decrease the necessary length of time for a complete time cycle, but may also increase the complexity of operation of sensors 101 because each of sensors 101 may require the ability to recognize their own signifier information during transmissions from ECU 301.

In some embodiments, ECU 301 may require an activation phase of operation in order to establish the TDM protocol upon initiation of the system. In an activation phase, ECU 301 may transmit an initialization command to all sensors 101 associated with a particular bus, and wait to receive responses from each of the sensors 101. The responses from sensors 101 may comprise signifier data operable to identify the respective sensor 101 for use in the TDM protocol. In the depicted embodiment, each of sensors 101 associated with a particular bus may attempt to respond as soon as the initialization command is received. In order to avoid conflicting responses along the power bus, each of sensors 101 may include at the beginning of its response a command for all other sensors 101 to enter a waiting mode until sufficient time has passed for ECU 301 to receive the instant sensor's response. After transmitting its response to the initialization command, each sensor 101 may enter a ready mode awaiting the beginning of a complete time cycle from the ECU 301, such as a timing signal.

During this initialization, ECU 301 may enter an activation mode wherein it is receptive to responses from each of sensors 101. ECU 301 may be aware of the total number of sensors 101 associated with the power bus, and thus may expect to receive all responses within a predetermined threshold of time. If all the expected responses are not received within the predetermined threshold of time, ECU 301 may generate an error code observable to a user or technician of the vehicle. After the ECU 301 receives all the expected responses from the sensors 101 associated with a power bus, the system may enter a communication mode: ECU 301 may exit the activation mode and begins transmitting a sync signal, and in response each of the associated sensors 101 may exit waiting mode and being responding to the sync signal. According to the TDM protocol. In some embodiments, the TDM protocol may be devised on-the-fly, with each division of time being assigned based upon the order in which the associated sensors 101 respond to the initialization command from ECU 301.

Figure 4:
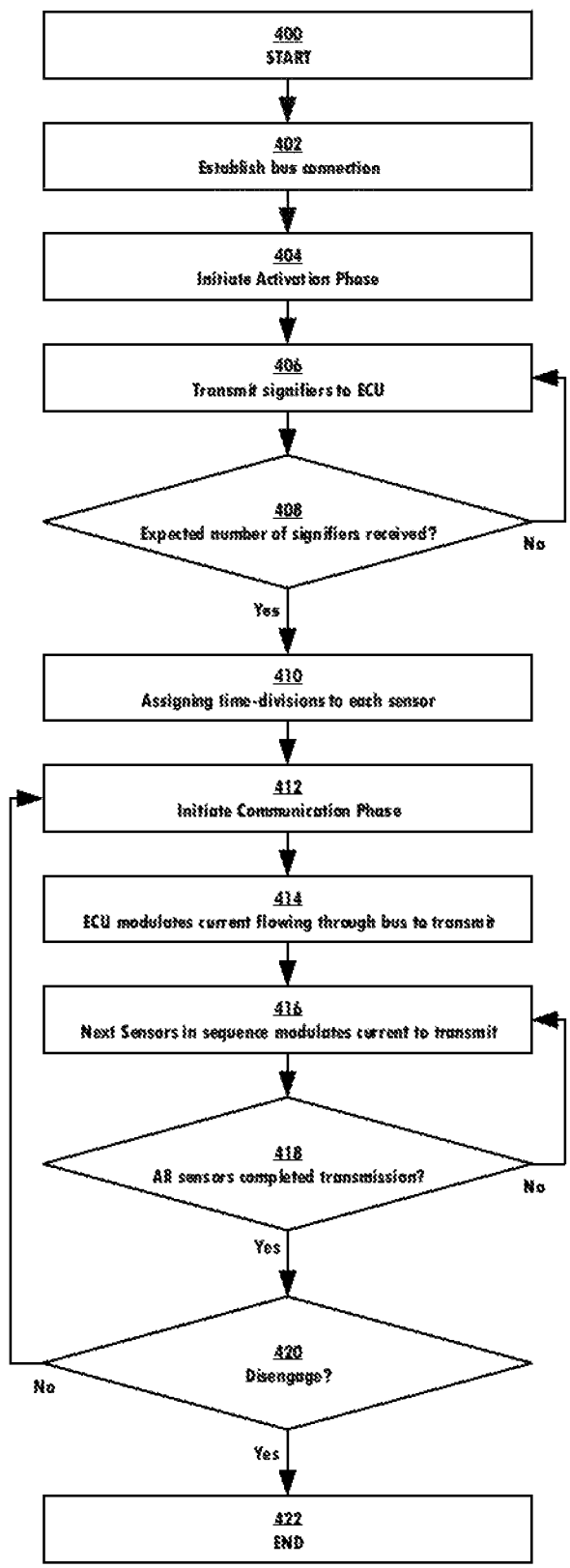
FIG. 4 is a flowchart illustrating a method of operating a vehicular sensor system.

FIG. 4 is a flowchart depicting a method of activating and operating a single bus of a vehicular sensor system according to an embodiment of the invention disclosed herein. The method begins at step 400, representing the initial activation of the system, such as in response to a key-on signal from the vehicle. At step 402, bus connections are established between an ECU and the sensors associated with the bus.

The method continues to step 404, where an activation phase is initiated. The ECU transmits an initialization command to each of the sensors, and waits for responses from each of the sensors. A signifier associated with a sensor is transmitted to the ECU at step 406. Because the ECU is aware of how many sensors are expected to be associated with the bus, the ECU checks at step 408 if all sensors have properly responded to the initialization command. If some sensors have not responded, the method returns to step 406 until the next sensor responds with a signifier for the ECU.

If all sensors have responded to the initialization command, the ECU assigns time divisions to each sensor with respect to a TDM protocol in step 410. After the TDM protocol has been established, the ECU initiates a communication phase at step 412, beginning a time cycle of the TDM protocol.

During the communication phase, the ECU may modulate the current flowing through the bus at step 414 in order to transmit data to each of the associated sensors. After the ECU completes its transmission, the sensors may sequentially modulate the current to transmit data back to the ECU at step 416. In some embodiments, step 414 and 416 may occur in a different order, concurrently, or in a switching sequence without deviating from the teachings disclosed herein.

At step 418, the ECU determines if the time cycle is completed. If the time cycle has not completed, the method returns to step 416 so that the ECU may receive the data associated with the sensor assigned to the next time division.

If the time cycle has completed, the method proceeds to step 420, where the ECU determines if it is appropriate to disengage the system, such as in response to a key-off signal from the vehicle. Some embodiments may comprise other reasons to disengage the system, such as a system fault, a disengage command, or any other reason known to one of ordinary skill in the art without deviating from the teachings disclosed herein. If there is no reason to disengage the system, the method returns to step 412 to initiate another time cycle of the communication phase. If the system should be disengaged, the method ends by proceeding to step 422.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle sensor system comprising:
   an electronic control unit (ECU) configured to be coupled to a vehicle and having an ECU pin configured to transceive a multiplex signal;
   a multi-pin bus electrically coupled to the ECU pin; and
   a number of sensors electrically coupled in parallel to the multi-pin bus via a wired connection, each of the number of sensors configured to be coupled to the vehicle and comprising a sensor processor, a sensor memory, and a sensor pin configured to transceive the multiplex signal,
   wherein the ECU is operable to transmit an activation command to each of the number of sensors by modulating a current,
   wherein each of the number of sensors operable to transmit a signifier to the ECU using the multiplex signal protocol, each signifier providing a respective identifier, and
   wherein said modulating the current comprises providing the current to the multi- pin bus according to a time-division multiplexing (TDM) protocol and maintaining a minimum current of electrical power supplied from the ECU to the sensors.

2. The system of claim 1, wherein the signifier comprises a part number.

3. The system of claim 2, wherein the ECU is configured to associated each part number with a known position of a sensor with respect to the vehicle.

4. The system of claim 1, wherein the signifier comprises a serial number.

5. The system of claim 1, wherein the signifier is encoded in a non-volatile portion of the sensor memory.

6. The system of claim 1, wherein each of the number of sensors are further operable to transmit data to the other sensors by modulating a current of the multi-pin bus.

7. The system of claim 1, wherein the number of sensors comprise ultrasonic sensors.

8. The system of claim 1, wherein the multi-pin bus is a first multi-pin bus and the system further comprises:
   a second multi-pin bus electrically connected to the ECU; and
   a second number of sensors electrically coupled to the second multi-pin bus, each of the second number of sensors configured to be coupled to the vehicle and comprising a sensor processor and a sensor memory,
   wherein the ECU is operable to transmit data to the second number of sensors by modulating a current flowing through the multi-pin bus, and wherein each of the second number of sensors is operable to transmit data to the ECU by modulating the current.

9. The system of claim 1, wherein the multi-pin bus comprises a two-pin bits.

10. The system of claim 9, wherein one of the pins of the two-pin bus comprises an electrically-neutral ground pin.

11. A method of transmitting data signals comprising:
    establishing a two-pin bus connection between an electronic control unit (ECU) and a number of sensors, each of the sensors wired in parallel to the two-pin bus connection;
    transmitting an activation command from the ECU to each of the number of sensors using a multiplex signal protocol;
    transmitting a signifier from each of the number of sensors to the ECU using the multiplex signal protocol, each signifier providing an identifier of its respective sensor for the ECU;
    transmitting data from the ECU to each of the number of sensors using multiplex signal protocol; and
    transmitting data front each of the sensors to the ECU using the multiplex signal protocol,
    wherein the multiplex signal protocol defines modulating a current provided to the two-pin bus according to a time-division multiplexing (TDM) scheme and the current modulation maintains a minimum current of electrical power supplied from the ECU to the sensors, the minimum current supplying power for the operation of each sensor.

12. The method of claim 11, wherein after the transmitting an activation command, the ECU remains in an activation mode until a predetermined number of signifiers are received from the number of sensors.

13. The method of claim 12, further comprising the step of the ECU generating a fault code in response to a condition of failing to receive the predetermined number of signifiers within a predetermined threshold of time.

14. The method of claim 11, wherein the step of transmitting data from the ECU to the number of sensors further comprises each of the number of sensors filtering the data to remove transmission noise.

15. The method of claim 14, wherein the step of transmitting data from the ECU to the number of sensors further comprises each of the number of sensors filter the data to remove transmission echoes.

16. The method of claim 11, wherein transmitting a signifier from each of the number of sensors to the ECU further comprises the ECU associating with each received signifier a known physical position of a sensor disposed at least in part within a vehicle body, the vehicle body being associated with a vehicle comprising the ECU.

17. The method of claim 11, wherein transmitting a signifier from each of the number of sensors to the ECU further comprises each of the number of sensors transmitting a signal that is received by the other sensors indicating that the other sensors should enter a waiting mode for a predetermined length of time sufficient for the ECU to receive the signifier.

\* \* \* \* \*

UNITED STATES PATENT AND TRADEMARK OFFICE
CERTIFICATE OF CORRECTION

PATENT NO. : 10,814,805 B2  
APPLICATION NO. : 16/177903  
DATED : October 27, 2020  
INVENTOR(S) : Michael White It is certified that error appears in the above-identified patent and that said Letters Patent is hereby corrected as shown below:

On the Title Page

The following section should be added after item (72):
--(73) Assignee: Robert Bosch GmbH, Stuttgart (DE)--.

In the Claims

In Claim 11, at Column 8, Line 34:
"transmitting data front each of the sensors" should read --transmitting data from each of the sensors--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*